US007503316B2

(12) United States Patent
Fujita et al.

(10) Patent No.: US 7,503,316 B2
(45) Date of Patent: Mar. 17, 2009

(54) ANTI-COKING BUSHING ASSEMBLY FOR AN EXHAUST RECIRCULATION CONTROL VALVE

(75) Inventors: Mahoro Fujita, Fairport, NY (US); Joseph G. Spakowski, Rochester, NY (US); Todd P. Geib, Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 97 days.

(21) Appl. No.: 11/807,853

(22) Filed: May 30, 2007

(65) Prior Publication Data

US 2008/0295812 A1 Dec. 4, 2008

(51) Int. Cl.

| | |
|---|---|
| ***F02M 25/07*** | (2006.01) |
| ***F02B 47/08*** | (2006.01) |
| ***F16K 11/00*** | (2006.01) |
| ***F16K 31/02*** | (2006.01) |

(52) U.S. Cl. ............ 123/568.11; 251/214; 251/129.15; 137/242

(58) Field of Classification Search ............ 123/568.11, 123/568.2, 568.21; 251/129.15, 214, 318; 137/242; 277/396

See application file for complete search history.

(56) References Cited

U.S. PATENT DOCUMENTS

| | | | | |
|---|---|---|---|---|
| 4,175,753 | A * | 11/1979 | Wentworth, Jr. | 277/396 |
| 6,453,934 | B1 * | 9/2002 | Bircann et al. | 137/242 |
| 6,874,754 | B2 * | 4/2005 | Geib et al. | 251/214 |
| 7,104,522 | B2 * | 9/2006 | Bircann | 251/214 |
| 7,104,523 | B2 * | 9/2006 | Busato et al. | 251/214 |
| 7,159,845 | B2 * | 1/2007 | Lyko et al. | 251/214 |
| 7,213,613 | B2 * | 5/2007 | Spakowski et al. | 251/250 |
| 2003/0006390 | A1 * | 1/2003 | Smith et al. | 251/129.15 |
| 2004/0051067 | A1 * | 3/2004 | Fujita et al. | 251/129.15 |

* cited by examiner

*Primary Examiner*—Willis R Wolfe, Jr.
(74) *Attorney, Agent, or Firm*—Paul L. Marshall

(57) ABSTRACT

An anti-coking bushing assembly for sealing a pintle shaft of an EGR control valve, comprising a bushing carrier disposed in the valve body and supportive of close-fitting pintle shaft bushing liners formed of a polyimide such as Vespel. The bushing carrier and bushing liners are installed into a carbon shield extending into the exhaust flow space within the valve. Within the carbon shield, between the gas flow space and the bushing carrier, is a ring seal on the pintle shaft and a gas expansion chamber to cool exhaust gas escaping along the pintle shaft, allowing contaminants in the exhaust gas to precipitate in the gas expansion chamber. The carbon shield, ring seal, bushing carrier, and bushing liners are conveniently pre-assembled as an anti-coking bushing assembly for subsequent installation into a valve body during final valve assembly.

10 Claims, 3 Drawing Sheets

ANTI-COKING BUSHING ASSEMBLY FOR AN EXHAUST RECIRCULATION CONTROL VALVE

TECHNICAL FIELD

The present invention relates to pintle-type valves; more particularly, to pintle-type valves for recirculation of exhaust gas from an exhaust manifold to an air intake manifold of an internal combustion engine; and most particularly, to such a valve having an improved bushing assembly for preventing coking and corrosion of the pintle shaft and bushing by exposure to engine exhaust, to prevent premature failure of the control valve.

BACKGROUND OF THE INVENTION

It is well known in the engine arts to improve internal combustion engine performance by variably re-circulating a portion of the engine exhaust back into the intake air stream for re-combustion with the fresh air/fuel mixture. The variable control device typically provided for this function is known in the art as an exhaust gas recirculation (EGR) valve.

The EGR process is chemically and mechanically demanding on EGR valve components. The condensates carried in the exhaust gases can be very corrosive of some types of metals in the EGR valve and in the exhaust system.

In a prior art EGR valve, because the exhaust gas pressure is higher in the valve group assembly than the actuator environment pressure (typically one atmosphere), exhaust gas flows into the space between the pintle shaft and the bushing, carrying carbon, corrosive condensate, and other contaminants into this clearance. In internal combustion engines generally, and especially in diesel engines, such contamination of the bushing/pintle shaft interface results eventually in pintle shaft sticking and degradation of components in the assembly.

Two principal causes of degradation by sulfuric acid condensate attack have been found to be a) bushing corrosion on the typical/common EGR bushing materials; and b) corrosion of iron components in the exhaust system. In diesel engines, these causes are abetted by the fact that the exhaust typically is significantly cooled by aftertreatment devices before reaching the EGR valve. Thus, corrosive compounds are readily precipitated onto the valve bushing components, especially when the engine is shutdown and those compounds are allowed to stand in contact with the bushing components. The pintle shaft may become stuck to the bushing, resulting in valve failure when the engine is restarted, accompanied by potential damage to the valve actuator.

This situation is especially worrisome for diesel engines employed in off-road activities, such as for powering farm tractors. The Federal standards for sulfur content in diesel fuel permit only 15 ppm for highway use, but for off-road use sulfur levels may be as high as 5000 ppm, resulting in very high levels of $H_2SO_4$ in the engine exhaust.

Further, in prior art EGR valves having a ring shaft seal, the seal typically is disposed between the valve group assembly and the actuator, the intent being to keep exhaust gases out of the actuator. Such a seal location, however, does nothing to protect the bushing and bushing/pintle shaft interface from exhaust gas attack.

What is needed in the art is an EGR valve having a bushing arrangement wherein a) materials of the wear surfaces are immune to corrosion compounds in exhaust gases; and b) significant volumes of exhaust gases are substantially prevented from reaching bushing/pintle shaft surfaces.

It is a principal object of the present invention to prevent failure of EGR valves due to bushing failure by exhaust gas corrosion in internal combustion engines.

SUMMARY OF THE INVENTION

Briefly described, an anti-coking bushing assembly for sealing a reciprocating pintle shaft of an EGR control valve comprises a bushing carrier supporting first and second bushing liners formed of a self-lubricating polymer such as a polyimide, for example Dupont® Vespel®. Preferably, the bushing carrier and bushing liners are installed into a prior art carbon shield extending into the exhaust gas flow space within the valve group. At the inner extreme of the carbon shield, between the gas flow space and the bushing carrier is a spring-loaded ring seal on the pintle shaft and preferably downstream of a first gas expansion chamber to slow and cool gas intruding from the gas flow space into the carbon shield along the pintle shaft. Some contaminants in the exhaust gas are thus forced to precipitate in the first gas expansion chamber. A second gas expansion chamber is formed by an annular recessed area surrounding the pintle shaft in the bushing carrier between the first and second bushing liners, wherein gas contaminants passing through the first gas expansion chamber and the ring seal are again given space to expand, cool, and condense without doing so on the bushing surfaces.

The carbon shield, ring seal, bushing carrier, and bushing liners are conveniently pre-assembled as an anti-coking bushing assembly in accordance with the invention, for subsequent installation into a valve group assembly during final valve assembly.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
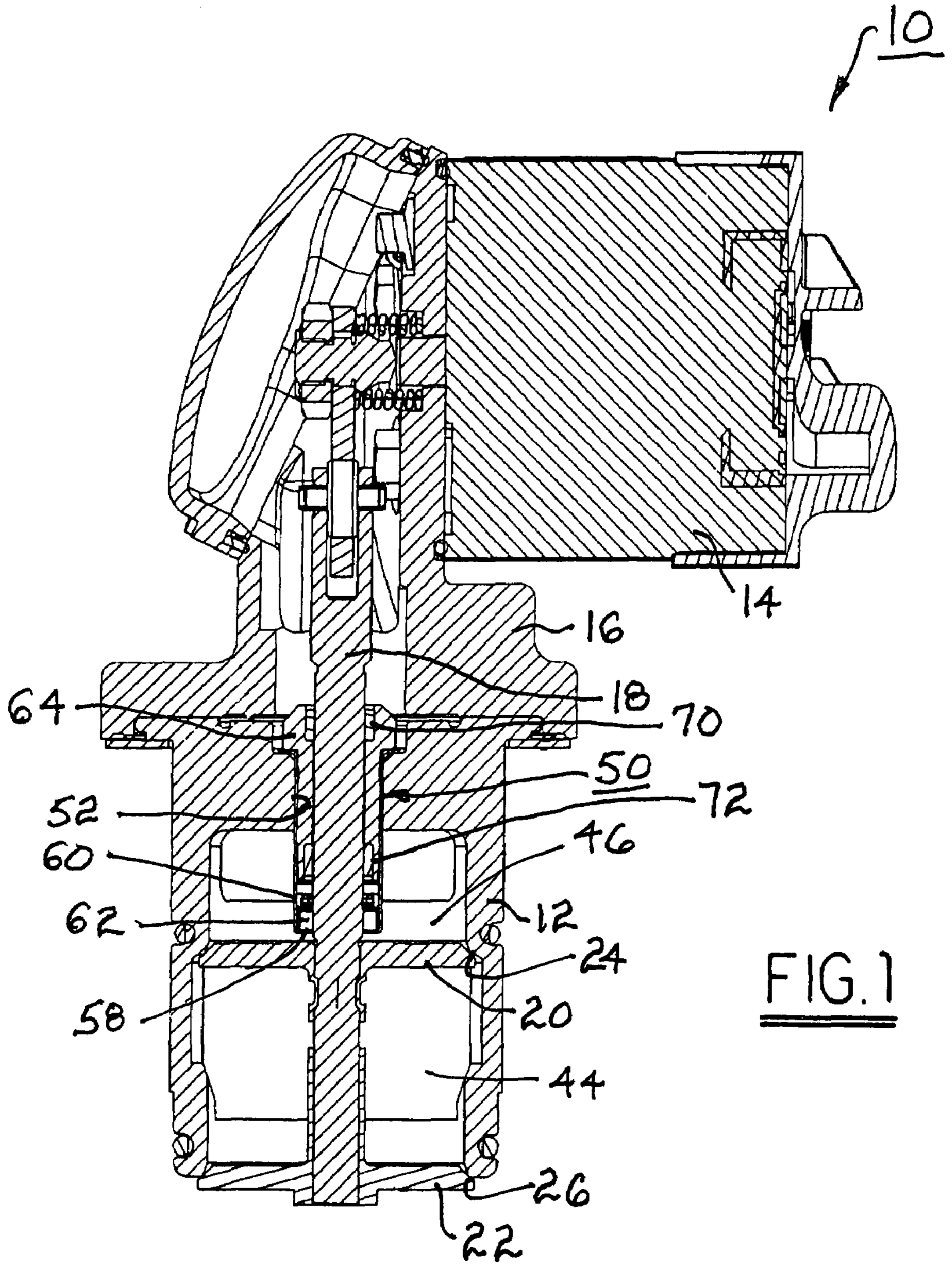
FIG. 1 is an elevational cross-sectional view of a complete EGR valve assembly including an improved bushing assembly in accordance with the invention.
Figure 5:
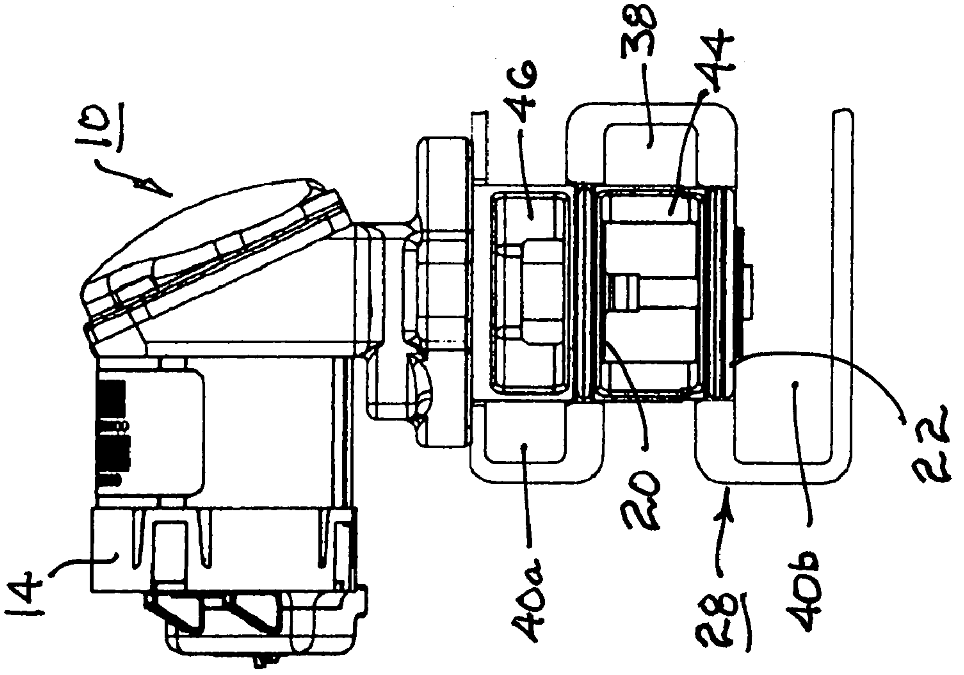
FIG. 5 is an elevational cross-sectional view showing the valve assembly of FIG. 1 disposed for use in the bore in the manifold juncture of FIG. 4.
Figure 4:
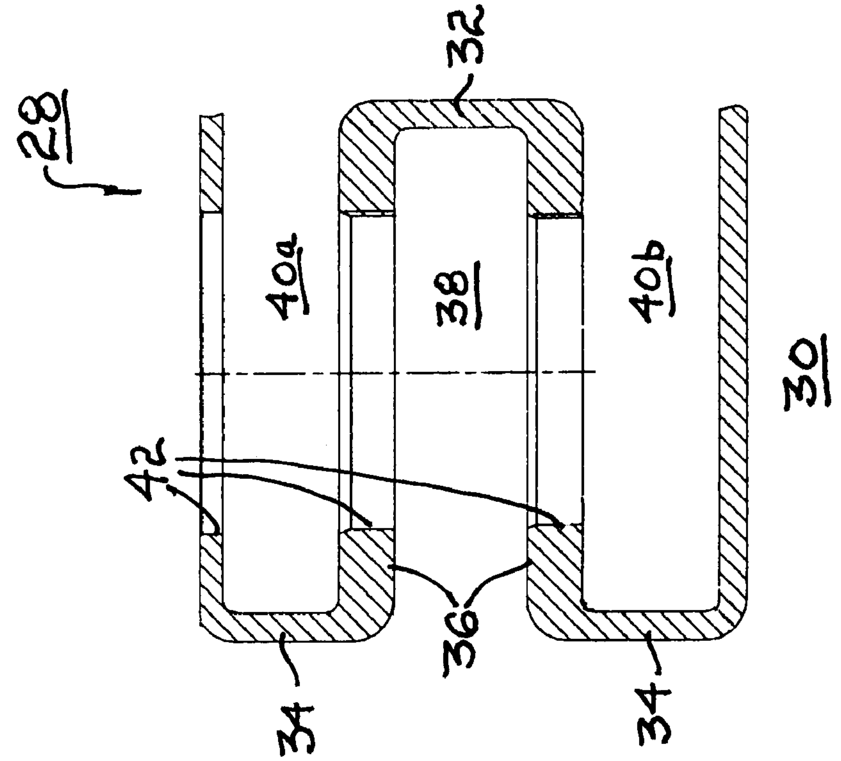
FIG. 4 is an elevational cross-sectional view of an exhaust manifold and intake manifold juncture having a bore for receiving the EGR valve shown in FIG. 1.

Referring to FIGS. 1, 4, and 5, an EGR valve assembly 10 in accordance with the invention comprises a valve body 12, also referred to herein as a seat tube; a rotary electromechanical actuator 14 mounted to valve body 12 via a standoff 16; a pintle shaft 18 connected to actuator 14 and supportive of first and second valve heads 20,22 for mating with first and second valve seats 24,26, respectively, formed in valve body 12.

A juncture 28 (FIGS. 4 and 5) is formed in an internal combustion engine 30 wherein exhaust manifold 32 and air intake manifold 34 share common walls 36 such that respective gas flow passages 38,40_a_,40_b_ are connected by a bore 42 there through.

Valve assembly 10 is mountable into bore 42, as shown in FIG. 5, such that a first chamber 44 in valve assembly 10 is in communication with exhaust gas passage 38, and a second chamber 46 and the area below the lower valve 22 are in communication with intake air passage 40_a_, 40_b_. It will be seen that opening of first and second valve heads 20,22 occurs simultaneously by movement of pintle shaft 18, thus bringing exhaust gas passage 38 into communication with both first and second intake air passages 40_a_,40_b_; the intake air passages are joined (not shown) before consumption of the intake air supply therein in the engine's intake air manifold (not shown).

The valve arrangement, manifold configuration, and valve operation as recited thus far are known in the prior art of EGR valves and valve use.

Figure 3:
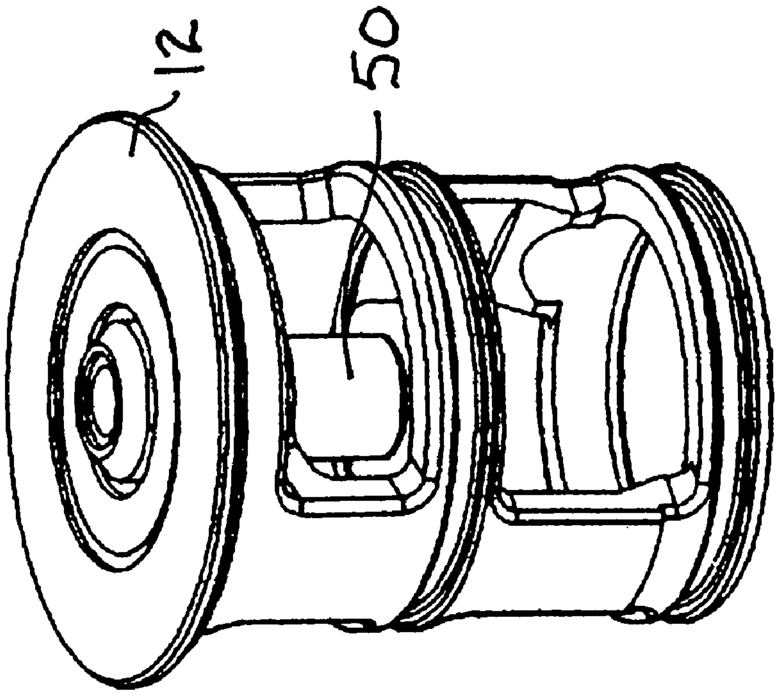
FIG. 3 is an isometric view of the valve body and bushing assembly shown in FIG. 2.
Figure 2:
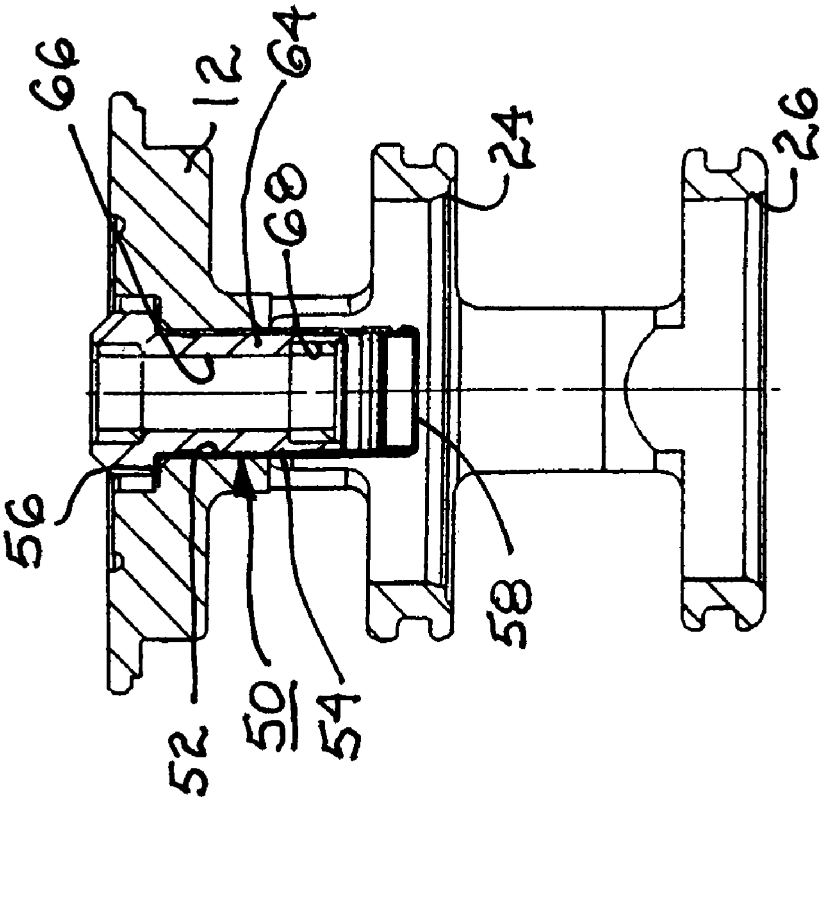
FIG. 2 is an elevational cross-sectional view of a valve body and improved bushing assembly for the EGR valve shown in FIG. 1.

Referring now to FIGS. 1 through 3, an improved anti-coking bushing assembly 50 in accordance with the invention is press-fittingly disposed within a shouldered axial bore 52 in valve body 12 and extends into communication with chamber 46.

Bushing assembly 50 comprises a cylindrical sleeve 54, known in the art as a carbon shield, having an outwardly-extending flange 56 at a first end distal from an exhaust gas flow space in said valve body for limiting ingress of assembly 50 into bore 52, and having an inwardly extending flange 58 at a second end proximal to said exhaust gas flow space for passage of pintle shaft 18 therethrough. Flange 58 is close-fitting to pintle shaft 18 to restrict leakage of exhaust gas along the pintle shaft, and it covers the pintle shaft working surface from the exhaust gas exposure.

A ring seal 60 is press fit into sleeve 54 adjacent or near flange 58 for further resisting creep of exhaust gases along the pintle shaft. A currently-preferred ring seal is a Variseal®, comprising a high-temperature Graphite filled PTFE polymeric body radially compressed against the pintle shaft by a stainless steel ring spring, available from Trelleborg Sealing Solutions, Broomfield, Colo., USA.

In one aspect of the invention, ring seal 60 is axially off-spaced from flange 58 to provide a first gas expansion chamber 62 wherein any exhaust gas leaking along the pintle shaft past flange 58 is caused to cool by adiabatic expansion, resulting in harmless precipitation of some corrosive materials on the chamber walls.

A bushing carrier 64 comprises a shouldered cylindrical component having an axial bore 66 for passage of pintle shaft 18. The shoulder positions the bushing carrier in sleeve 54 by contact with flange 56, and during assembly into a completed valve assembly the bushing carrier and bushing assembly are retained in position against exhaust gas pressure by a press fit with carbon shield and valve body 12. Bushing carrier 64 includes first and second annular recesses 67,68 for receiving first and second bushing liners 70,72, respectively, which are close-fitting to pintle shaft 18. The bushing liners are entered into the recesses from the ends of the bushing carrier which is then staked to retain the bushing liners. Preferably, axial bore 66 is larger than the diameter of shaft 18 and only slightly larger in diameter, e.g. +100μ, than the inner diameter of liner 70, 72 such that the shaft makes contact with only the bushing liner surfaces.

Bushing carrier 64 is formed from a corrosion-resistant metal, preferably an austenitic stainless steel from the AISI 300 series. Bushing liners 70,72 are formed from a low-friction, corrosion resistant polymer, preferably a polyimide such as Vespel®.

Improved anti-coking bushing assembly 50 embodies three distinct advantages over prior art bushing assemblies:

1) The ring seal is provided as the assembly shaft-sealing element nearest to the source of exhaust gas, the goal being to keep condensate, which can carry corrosion products or can cause bushing corrosion, out of the critical bushing/shaft interfaces.

2) Durable, chemical resistant, high-temperature, non-metallic, low-friction liner material is inserted into the bushing carrier, the goal being to have a low-friction, chemical resistant pintle/bushing interface. Vespel® is currently preferred because it is a known low-friction high-temperature non-metallic material in wide use for bushings, gears, and other wear surfaces and is not attacked by sulfuric acid or other exhaust condensate chemicals.

3) A raw stainless steel bushing body may be used because the bushing body does not make contact with the pintle shaft; all bushing load is carried by the Vespel bushing liners. Thus, typical EGR bushing materials (for example, triballoy, as used in the prior art), which are known to be corroded by sulfuric acid, are obviated. The goal is to remove from the bushing region all materials that can produce corrosion contaminants from exposure to exhaust gases.

4) Optionally, the ring seal is off-spaced from the flange end of the assembly sleeve to provide a gas-expansion chamber for adiabatic condensation of corrosive materials from exhaust gases.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An exhaust gas recirculation valve assembly for use in an internal combustion engine, comprising:

a) a valve body having a first chamber therein for communication with an exhaust gas flow in said engine, and having a second chamber therein for communication with an intake air flow in said engine, and having a valve seat in a port between said first and second chambers;

b) a pintle shaft extending into said valve body coaxial with said port for supporting a valve head matable with said valve seat for variably opening said port to permit exhaust gas flow therethrough;

c) an actuator mounted to said valve body and connected to said pintle shaft for axial actuation thereof; and d) an anti-coking bushing assembly disposed in a bore in said body for supporting said pintle shaft during said axial motion thereof, said anti-coking bushing assembly including a sleeve having a first end distal from, and a second end proximal to, an exhaust gas flow space in said valve body, a ring seal disposed within said sleeve adjacent said second sleeve end for sealing against said pintle shaft, and at least one bushing liner disposed within said sleeve for supporting said pintle shaft during axial motion thereof in use of said exhaust gas recirculation valve assembly.

2. An anti-coking bushing assembly for use in an exhaust gas recirculation valve assembly in an internal combustion engine, comprising:

a) a sleeve having a first end distal from, and a second end proximal to, an exhaust gas flow space in said exhaust gas recirculation valve;

b) a ring seal disposed within said sleeve adjacent said second sleeve end for sealing a pintle shaft of said exhaust gas recirculation valve; and c) at least one bushing liner disposed within said sleeve for supporting said pintle shaft during axial motion thereof in use of said exhaust gas recirculation valve assembly.

3. A bushing assembly in accordance with claim 2 wherein said ring seal is off-spaced from said second sleeve end to define a gas expansion chamber within said sleeve.

4. A bushing assembly in accordance with claim 2 wherein said sleeve includes a first radial flange at said distal end for positioning said sleeve within said valve assembly and a second radial flange at said proximal end being close-fitting to said pintle shaft.

5. A bushing assembly in accordance with claim 2 wherein said sleeve is formed to be press-fit into said valve assembly.

6. A bushing assembly in accordance with claim 2 wherein said ring seal comprises a high-temperature, corrosion-resistant polymer and a ring-shaped spring.

7. A bushing assembly in accordance with claim 6 wherein said polymer includes PTFE.

8. A bushing assembly in accordance with claim 2 further including a bushing carrier disposed within said sleeve wherein said at least one bushing liner is disposed within said bushing carrier.

9. A bushing assembly in accordance with claim 8 wherein said bushing carrier comprises a body having an axial bore for passage of said pintle shaft therethrough, said axial bore having a diameter greater than the diameter of said pintle shaft and having at least one annular recess for supporting said at least one bushing liner.

10. A bushing assembly in accordance with claim 8 comprising a plurality of bushing liners disposed within said bushing carrier.

* * * * *